United States Patent [19]

Costas

[11] Patent Number: 4,916,453

[45] Date of Patent: Apr. 10, 1990

[54] SPATIAL FILTERING SYSTEM

[75] Inventor: John P. Costas, Waban, Mass.

[73] Assignee: Cogent Systems, Inc., Waban, Mass.

[21] Appl. No.: 332,719

[22] Filed: Apr. 3, 1989

[51] Int. Cl.[4] ............................................... H04B 7/00

[52] U.S. Cl. .................................... 342/368; 367/125

[58] Field of Search ........ 342/378, 383, 384, 379–382; 367/125

[56] References Cited

U.S. PATENT DOCUMENTS 4,255,791 3/1981 Martin ....................................... 342/

4,316,191 2/1982 Sawatari et al. .......................... 342/

4,431,945 2/1984 Barton et al. ............................ 342/

*Primary Examiner*—Thomas H. Tarcza

*Assistant Examiner*—Mark Hellner

*Attorney, Agent, or Firm*—Joseph S. Iandiorio

[57] ABSTRACT

An improved spatial filtering system includes a plurality of tracker modules for isolating selected signals from an array of signal data values collected from a signal environment by a plurality of receiver elements and stored in a residual signal storage element. Each tracker module includes a generating module for generating, from the array of signal data values, estimated contributions of a selected signal at each of the plurality of receiver elements. Each tracker module also includes an output signal estimation module, connected to the generating module, for determining, based on the estimated contributions, an output signal that is representative of the selected signal. A system control unit enables at least a first tracker module to selectively read the array of signal data values and to selectively combine the generated estimated contributions with the array of signal data values in the residual signal storage element to alter the array of signal data values during the generation of estimated contributions by other tracker modules.

15 Claims, 5 Drawing Sheets

SPATIAL FILTERING SYSTEM

FIELD OF INVENTION

This invention relates to the field of spatial filtering to obtain the direction of and signal recovery from a signal source and more particularly to an improved spatial filter utilizing a plurality of tracker modules, each assigned to isolate a far-field signal.

BACKGROUND OF INVENTION

Spatial filters are used for isolating the source of a signal from a plurality of signal sources, each transmitting a signal having approximately the same frequency. Spatial filters are commonly phased array systems which include an array of antenna elements for receiving the plurality of signals from the far-field. Typically, these antenna elements are arranged so that they are equidistant and lie along a straight line. The actual distance between the elements often depends on the wavelength of the far-field signals. Usually, that separation is approximately one-half wavelength. This arrangement of elements forms an aperture which is used to sample the incidence of electromagnetic or acoustical energy in the environment. This energy induces a sinusoidal signal voltage at each of the elements which, at some observational instant, may be represented by a complex value. The amplitude of this value is proportional to the amplitude of the induced sinusoidal signal voltage, while the phase of the complex value corresponds to the phase angle of the induced sinusoidal signal. The representation of sinusoidal signals by complex values is commonly known as a "complex envelope" representation which is made relative to a convenient frequency and phase reference.

There are a multiplicity of induced sinusoidal signals at each element of the array, one signal for each signal source in the far-field. The phase progression of the induced sinusoidal signals, from element-to-element, for a given signal source depends upon the spatial angular location of that source. As the angular position of a signal source moves from a position perpendicular to the axis of a linear array of elements (broad side) toward a spatial position along the axis of the line array (end fire), the element-to-element phase progression increases. Thus, the element-to-element phase progression may be used as a discriminant in a spatial filter to isolate signals coming from different far field sources.

Signal sources located at a particular angle are detected by properly weighting the array of data values, or voltage induced at each element, and then summing the results. Generally, weight sets are applied to compensate for the phase shift of the induced voltage at each element. Amplitude weighting is also used at times to modify the response of the spatial filter. For example, a weight set whose amplitudes tend to decrease from the center of the array of data values to its ends causes the spatial filter side lobe levels to be reduced, but at the expense of a wider main beam.

Phase shift is a factor which corresponds to a phase progression of an incident plane wave from a given far-field source as it strikes the elements. If the phase of the voltage induced at each of the elements is properly phase compensated by a weight set, the sum of the array of signal data values produces a dramatic response which corresponds to the signal source at the angle corresponding to the phase-compensation procedure. By changing the weight set, different signal sources at different angles can be located using the same array of element data values.

One problem associated with this classical method of spatial filtering (conventional beam forming) arises from the limitations imposed by an array aperture having a limited number of elements, and consequently a limited aperture size. Such limitations control the narrowness of the main beam and the depth of suppression in the side lobe regions of the spatial filter. Using this limited aperture, it becomes difficult to isolate the signal from far-field sources that are closely spaced in angular position. It also becomes difficult to isolate the signals from widely spaced sources when there is a large signal level difference between signals. Further, a very strong signal in the side lobe region may produce significant interference at the output of the spatial filter because of the limited side lobe suppression available from the spatial filter.

A second problem associated with classical spatial filtering or conventional beam forming involves the fact that the spatial filter, designed to isolate the signal from one particular far-field source, must contend with induced signal voltages from the array elements caused by other far-field sources. Since the time of the invention of wave filters by the Bell Telephone Laboratories at the turn of the century, this second problem has generally been accepted as a given. Our invention demonstrates that this second problem may be avoided with dramatically improved results.

SUMMARY OF INVENTION

It is therefore an object of this invention to provide an improved spatial filter that isolates one or more selected far-field signals by providing an environment which suppresses the effects of all signals other than the selected signal.

It is a further object of this invention to provide a spatial filter that improves the effective resolution for a signal in a selected direction.

It is a further object of this invention to provide a spatial filter that effectively narrows the beam width and reduces the level of the side lobes relative to a source signal.

It is a further object of this invention to provide a spatial filter that improves the accuracy of estimating the direction of a signal source.

It is a further object of this invention to provide a spatial filter that decreases interference by a non-selected signal.

It is a further object of this invention to provide a spatial filter that can operate in a more crowded signal environment.

This invention results from the realization that an improved spatial filtering system for isolating one or more selected far-field signals and for accurately locating their respective signal sources can be accomplished by using one or more tracker modules, each assigned to a spatial position for determining the induced signal component at each element of an array of receiver elements for a selected far-field signal at that spatial position and by selectively attenuating those induced signal components to prevent them from interfering with the analysis of other tracker modules operating at other spatial positions.

This invention features an improved spatial filtering system for isolating selected signals from an array of signal data values collected from a signal environment by a plurality of receiver elements and stored in a residual signal storage element. The system includes a plurality of tracker modules for selectively reading the array of signal data values to isolate a selected signal. Each tracker module includes means for generating, from the array of signal data values, estimated contributions of a selected signal at each of the plurality of receiver elements. Each tracker module also includes means, connected to the means for generating, for determining an output signal that is based on the estimated contributions and is representative of the selected signal. Control means enables at least a first tracker module of the plurality of tracker modules to selectively read the array of signal data values and to selectively combine the estimated contributions, generated by the means for generating for that tracker module, with the array of signal data values in the residual signal storage element to alter the array of signal data values during the generation of estimated contributions by other tracker modules.

The improved spatial filtering system may further include means, connected to the means for generating, for storing the estimated contributions. The means for determining may also include means for summing the estimated contributions to determine the output signal. The control means can alter the array of signal data values by selectively adding or subtracting the estimated contributions to the array of signal data values stored in the residual signal storage element.

The means for generating can further include means for producing a phase progression of signal data values, based on the array of data values read from the residual signal storage element, and means for estimating, based on the phase progression of signal data values, the contributions of the selected signal at each of the plurality of receiver elements. The means for producing can include phase angle taper means for compensating the signal data values with a phase corrector, based on an estimated angular position of the selected signal source relative to the plurality of receiver elements, to produce the phase progression of signal data values. The means for generating may further include phase angle refining means, connected to the means for estimating, for approximating, based on the phase progression of signal data values, a residual phase progression. The phase angle refining means also can produce, based on residual phase progression, an updated estimate of angular position of the selected signal source and an updated phase corrector to compensate for the residual phase progression and to update the phase corrector of the phase angle taper means with the updated phase corrector for that selected signal. The means for generating can also include restoring means for applying a phase restorer to remove the compensation of the phase corrector on the estimated contributions, before the control means selectively combines the estimated contributions with the array of data values in the residual signal storage element.

The control means can include means for selectively enabling each of the plurality of tracker modules to selectively generate updated estimated contributions by selectively controlling each of the plurality of tracker modules to selectively read the array of signal data values from the residual signal storage element. The control means then selectively combines the stored estimated contributions, generated by the means for generating for each tracker module, with the array of signal data values in the residual signal storage element to alter the array of signal data values during the generation of estimated contributions by other tracker modules. The control means can also initiate and selectively terminate successive generations of updated estimated contributions by each tracker module. Successive generations can be terminated when a predetermined condition is satisfied. The control means can further include means for selectively attenuating estimated contributions, generated by other tracker modules assigned to isolate different signals, from the array of the signal data values in the residual signal storage elements. The control means also include means for adding, to the array of signal data values in the residual signal storage element, estimated contributions previously generated by each tracker module before it is selectively enabled to generate updated estimated contributions. The control means can also include means for directing the means for determining, for each tracker module, to determine the output signal when successive generations of updated estimated contributions are terminated.

DISCLOSURE OF PREFERRED EMBODIMENTS

Other objects, features and advantages will occur to those skilled in the art from the following description of preferred embodiments and the accompanying drawings, in which.

Figure 1:
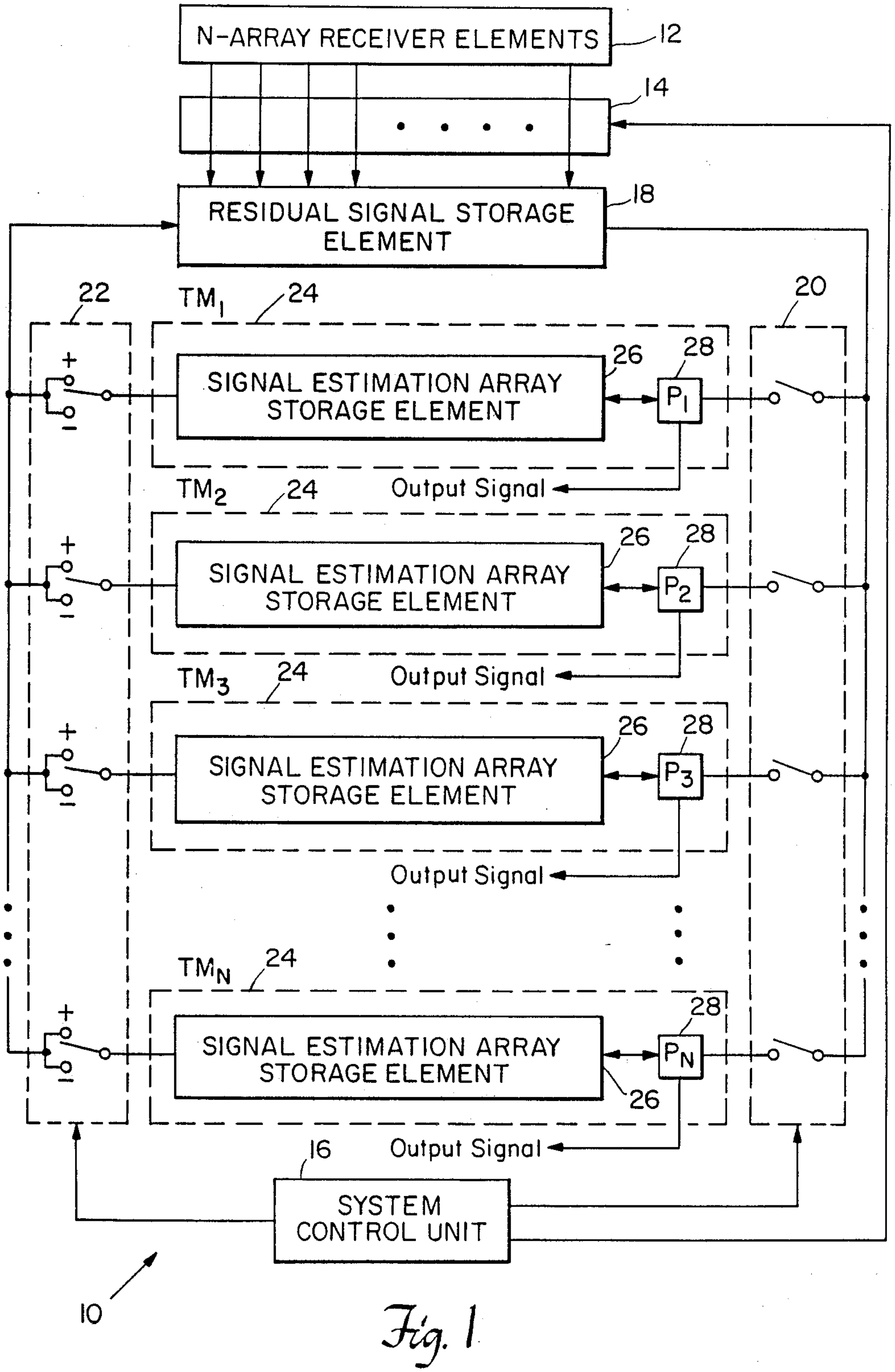
FIG. 1 is a block diagram of a spatial filtering system according to the present invention for isolating a plurality of signals from a signal environment.
Figure 3A:
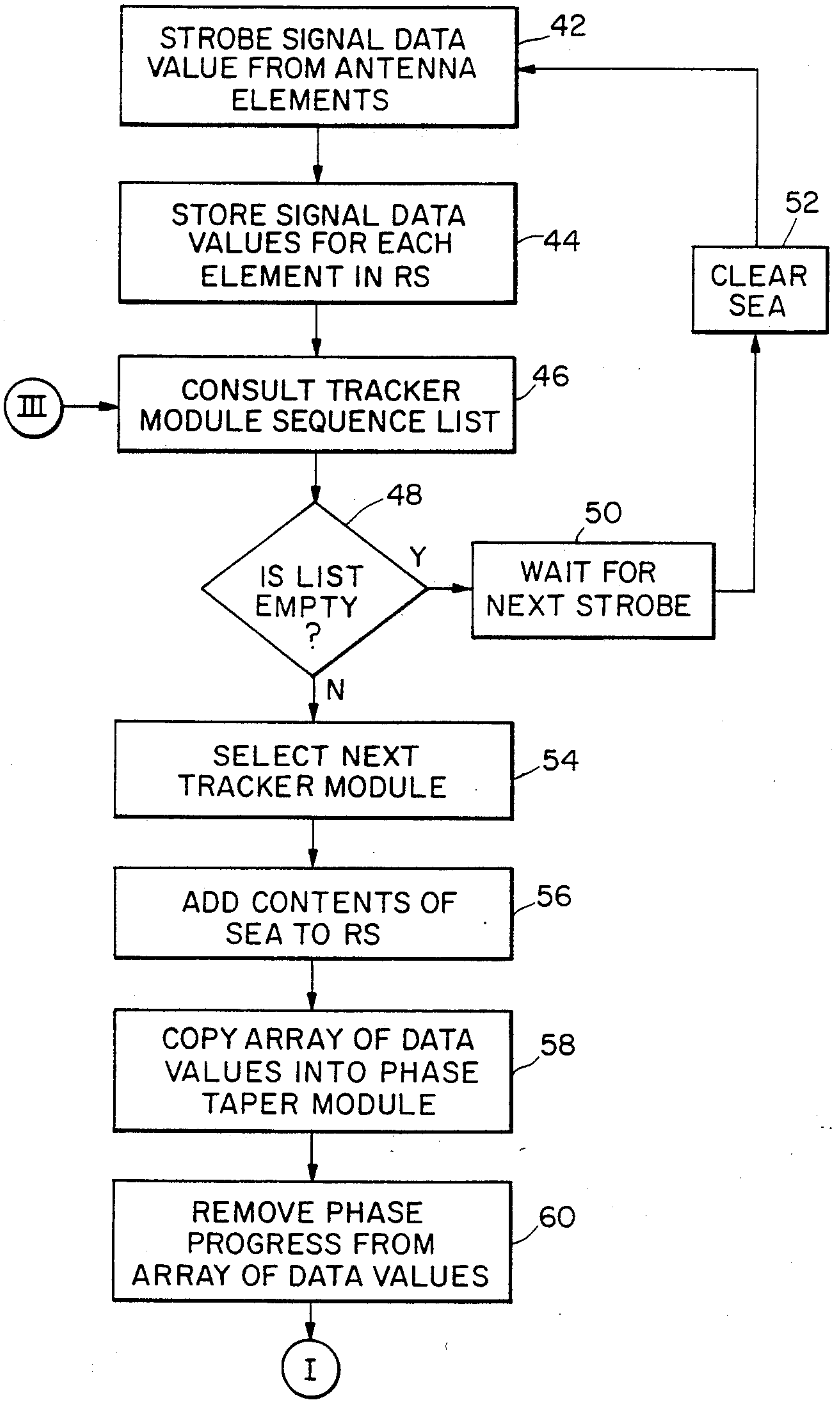
Figure 3B:
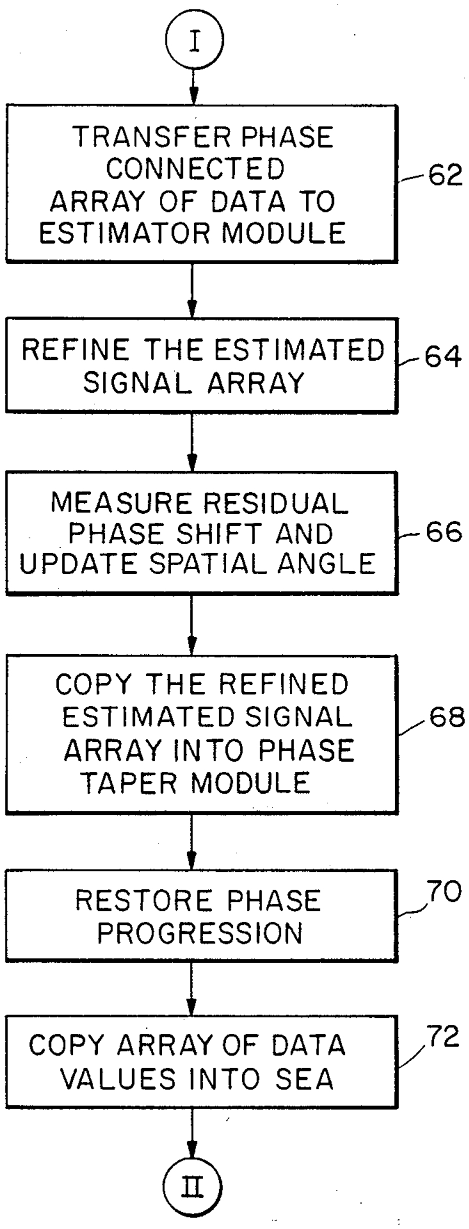
Figure 3C:
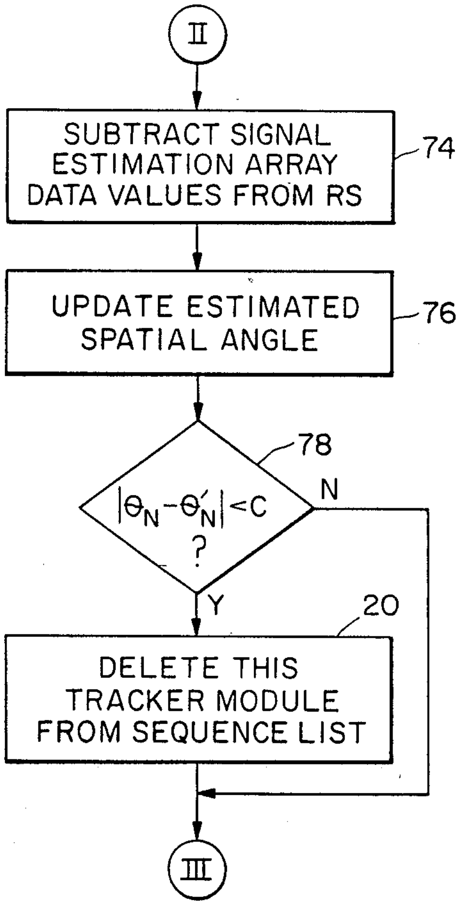
Figure 4:
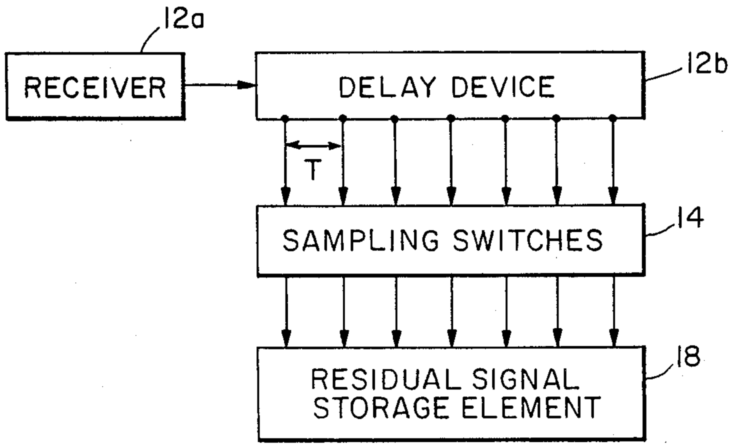

FIGS. 3A–C are flow diagrams for the system control unit of FIG. 1 for isolating the plurality of signals from the signal environment; and FIG. 4 is a block diagram showing a receiver and delay device used for time domain wave filtering.

An improved spatial filtering system according to the present invention for isolating far-field signals in the environment can be accomplished by sequentially analyzing an array of stored data values obtained from an array of receiver elements using a plurality of tracker modules. Each tracker module is prearranged to be successively enabled by a system control unit to isolate a different far-field signal. The process of isolating the selected far-field signal by each tracker module includes generating the best estimated contributions of that assigned signal at each of the receiver elements. These estimated contributions are then subtracted from the stored data values before the next tracker module is enabled. This operation reduces the level of the stored data values by the contributions of the assigned signal and prevents those contributions from interfering with the generation of estimated contributions for other signals by successive tracker modules. During successive tracker module cycles, the previously generated estimated contributions of the enabled tracker module is first added back to the residual array of data values in order to restore the assigned signal contributions to full value. An updated estimated contributions for its assigned signal is then generated while all of the other tracker signal contributions are attenuated.

Generating updated estimated contributions by each tracker module is terminated when a predetermined condition, such as a small difference in successive generations of estimated contributions, is satisfied. The most recent updated estimated contributions are then used to generate an output signal that represents the assigned far-field signal.

The improved spatial filtering system includes an N-element residual signal storage element which is initially loaded with an array of signal data values from an array of receiver elements by simultaneously closing N-sampling switches. The sampling switches are operated by a system control unit. The array of data values stored in the residual signal storage element are then sequentially made available by the system control unit to one of a plurality of tracker modules by selectively controlling a series of input switches.

Each tracker module is configured to isolate a selected far-field signal from the stored data values, which serves as a data pool, by generating the estimated contributions of the selected far-field signal at each receiver element. Based on the estimated contributions, an output signal that is representative of that selected far-field signal can then be determined. Each tracker module also includes a signal estimation array storage element for storing the generated estimated contributions for the selected far-field signal. Under the control of the system control unit, these stored contributions are selectively combined with the array of signal data values stored in the residual signal storage element to alter the array of signal data values during the generation of estimated contributions by other tracker modules.

Estimated contributions for a selected signal at each of the receiver elements are generated from the array of signal data values by a signal estimation processor. The signal estimation processor also determines, based on the estimated contributions, the output signal for the selected signal. The signal estimation processor includes a phase taper module for compensating the array of data values obtained from the residual signal storage element to eliminate any phase progression across the array of data values for the selected far-field signal arising from a selected angular position. The processor also includes an estimation module for filtering noise and other interference components from the array of data values and for refining the estimated contributions of the selected signal at each receiver element. A phase angle refining module can also be included to produce an updated spatial angular position estimate of the selected signal source and to update a phase corrector used by the phase taper module to phase compensate the array of data values.

In the preferred embodiment, an improved spatial filtering system 10, FIG. 1, includes an array of N receiver elements 12 for collecting signal data values from a signal environment. Receiver elements 12 preferably include a plurality of antenna elements arranged so that they are equally spaced and lie approximately along a straight line. The signal data values at each element are sampled by sample switches 14 under the control of a system control unit 16 to provide an array of signal data values. This array of signal data values is stored in a residual signal storage element 18.

The rate at which sampling is done depends on the bandwidth of the desired signals from the far-field sources. Generally with higher bandwidths, sampling must be done more often. The number of receiver elements is normally limited by the available antenna aperture. With a greater number of elements the inherent spatial resolution properties of the basic antenna array are increased.

A plurality of tracker modules 24 are interconnected to residual signal storage element 18 via switches 20 and 22 and are configured to isolate different selected far-field signals from the array of signal data values stored in residual signal storage element 18. Each tracker module includes a signal estimation processor 28 and a signal estimation array storage element 26. Signal estimation processor 28 generates, from the array of signal data values, an array of estimated contributions produced by the selected signal at each of the plurality of receiver elements. It also determines an output signal, which is representative of the selected signal. Signal estimation array storage element 26 stores the latest generated array of estimated contributions.

Initially, tracker modules 24 are successively enabled, by system control unit 16 via input switches 20, to read the array of signal data values from residual storage element 18. The actual sequence that each tracker module 24 is enabled can be predetermined by prioritizing the signals to be isolated. Once enabled, estimated contributions are generated, based on this array of signal data values, by signal estimation processor 28 and are stored in its signal estimation array storage element 26. Before the next tracker module 24 is enabled, these estimated contributions are subtracted from the array of signal data values stored in residual signal storage element 18 by means of output switch 22 set to the minus position. The remaining residual signal data values are then used by the next tracker module enabled by system control unit 16 for generating estimated contributions at each receiver element for the far-field signal assigned to that tracker module. These estimated contributions are subtracted from the previous residual signal array data values, just as they were with respect to the previous tracker modules. Thus, during the first cycle of the system, the residual signal storage element data values are sequentially altered by subtracting the estimated contributions as determined by each enabled tracker module. As a result, the contributions of all far-field signals, assigned to the tracker modules, at each receiver element are successively removed.

During each cycle thereafter, the previously estimated contribution for the enabled tracker module is first added to the remaining residual array of signal data values stored in residual signal storage element 18 by means of switch 22 set to the plus position. An updated estimated contribution is then generated by that tracker module. Note that this initial addition restores the original contributions of the assigned signal to full value. The estimated contributions as determined by all of the other track modules remain subtracted. Thus, by subtracting the stored data in signal estimation array storage element 26 from residual signal storage element 18 at the end of each tracker module cycle and then adding that data back into the residual signal storage element 18 at the start of each tracker module cycle, each tracker module 24 will be working with input data that contains the assigned signal contributions at full level while all other tracked signal contributions will appear in a severely attenuated state. It should also be noted that this sequence may also be followed by each tracker module 24 during the initial cycle of the system if, during the initialization of the system, the signal estimation array storage element 26 for each tracker module is initially cleared. This would render the initial data addition, through switch 22, to have a "no operation" status.

Figure 2:
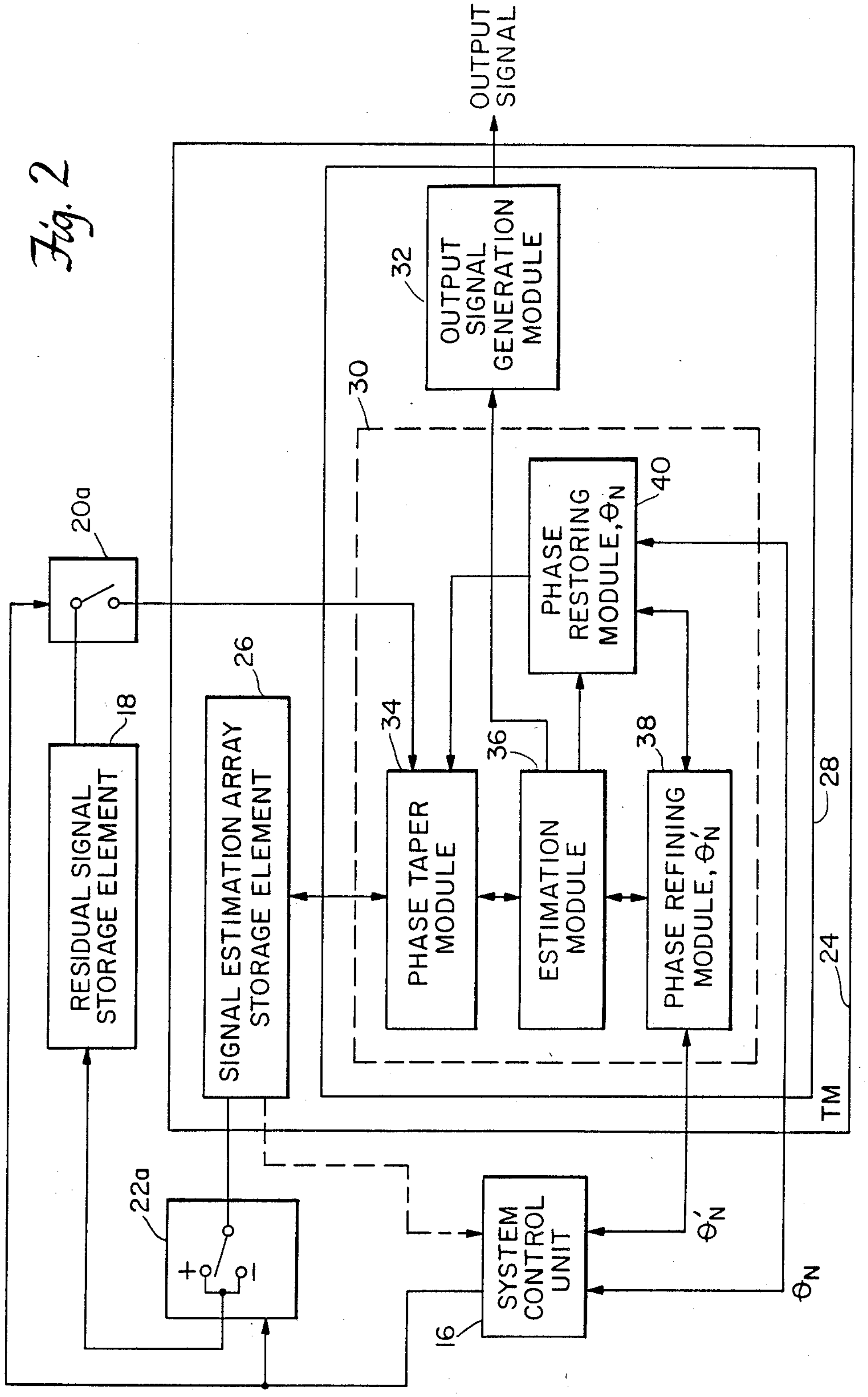
FIG. 2 is a more detailed block diagram of one of the tracker modules shown in FIG. 1 for isolating a selected signal from the signal environment.

A more detailed block diagram of tracker module 24 is shown in FIG. 2. Signal processor unit 28 of tracker module 24 includes a generating module 30 and an output signal estimation module 32. Generating module 30 includes a phase taper module 34, an estimation module 36, a phase refining module 38, and a phase module 40. Together, these modules cooperate to generate a best estimate of the contributions of the signal data values at each of the receiver elements. When the best estimate is determined, output signal generation module 32 generates, based on those estimated contributions, an output signal that is representative of the selected signal.

During the operation of the system, system control unit 16 selects a tracker module 24 by activating switch 22A to a plus state so that the contents or array of data values stored in signal estimation array storage element 26 are added to the array of data values stored in residual signal storage element 18. As mentioned above, this array of data values represents the estimated contributions of that selected signal at each of the receiver elements. This addition takes place on an element-to-element basis. The resulting array of signal data values stored in residual storage element 18 is then copied via switch 20A into phase taper module 34. Phase taper module 34 contains an appropriate set of storage elements for storing this data array.

Phase module 40 contains a storage element which holds a current estimate of the assigned far-field signal spatial angle, $\theta_n$. In the preferred embodiment, the initial estimates of the far-field signal spatial positions of the selected signals are obtained from system control unit 16. These initial estimates may be obtained from a Butler Matrix scan or similar signal location means. Using this spatial angle $\theta_n$, phase module 40 computes and applies the phase correction needed for each element of complex data stored in the phase taper module 34 in order to eliminate the element-to-element phase shift of the stored complex data array. If the estimated spatial angle is correct, each of the complex data values stored in phase-taper module 34 has, as a result, the same phase. If the estimated spatial angle is wrong, a residual phase progression remains in the stored array of data values in phase taper module 34.

The phase compensated array of data values stored in phase taper module 34 is then copied into estimation module 36. These data values are then used by estimation module 36 to obtain a revised estimate of contributions at each element for the assigned signal. This refined estimate can be achieved by using a Kalman filter or equivalent to obtain estimates of signal values at each element, based on the finite data aperture made available. Such filters are commonly available and are known to those skilled in the art. In a preferred alternative, estimation module 36 generates a revised estimate of contributions at each element using an augmented convolution process.

This augmented convolution process is based on linear filtering (convolution) of the limited set of data values using a filter transient response which contains symmetric decaying exponentials from a center peak value. The rate of decay of the exponential terms is adjusted, assuming that there is an infinite data sample, to optimize the estimation. Transient buildup and decay effects, which occur when a limited number of data values is filtered with a linear filter, are then compensated for by determining parameters which define the missing exponential transients of the data set that occur outside the present array of data values. These missing exponential transients are then synthesized and added to the normal filter or convolver output. Hence, the linear filter or convolver output is augmented by terms which compensate for the absence of input data outside the available data window. This augmented convolution process has proved to be a very effective signal estimator, which significantly reduces the computational needs that are required by other prior art signal estimation means such as the Kalman filter. The augmented convolution process is detailed in a report TR 88-03, *An Engineering Approach to Signal Estimation* prepared by Cogent Systems, Inc., Box 98, Waban, MA 02168, dated 18 May 88.

The refined estimate is then tested for residual element-to-element phase progression by phase refining module 38, and a new estimate of the spatial angle $\theta'_n$ is derived. The new estimate of the spatial angle $\theta'_n$ can be derived by measuring the phase differences between adjacent data values and computing an average phase difference. The average phase difference is then used to determine a spatial angle error which is used to correct the spatial angle, $\theta_n$. This refined spatial angle estimate is then copied into the storage elements of phase module 40 and system control unit 16 for later use. The estimation module 36 data is next copied back into the phase taper module 34. The original estimated spatial angle $\theta_n$ is then used to restore the original element-to-element phase shift in phase taper module 34. Phase refining module 38 then updates the estimated spatial angle stored in phase module 40 with the new estimated spatial angle $\theta'_n$. In the alternative, the new estimated spatial angle may be used for restoring the phase progression initially present in the array of data values. The updated spatial angle is used during the next generation of estimated contributions by generating module 30.

Once the phase progression has been restored, the array of data values is copied and stored by signal estimation array storage element 26, and the array of data values is subtracted from the array of data values stored in residual signal storage element 18 via switch 22A. The overall effect is that a better estimate of the contributions, for a selected signal received, at each element is subtracted from the array of data values stored in residual signal storage element 18 to reduce its interference with other tracker modules, which are isolating different far-field spatial signals. At this time, the estimated spatial position of the selected signal is updated for the assigned far-field source.

The output signal can be generated by output signal generation module 32 using conventional beam former methods. For example, the output signal can be obtained by smoothing the array of data values stored in estimation module 36 since the phase progression has been removed by previous action in phase taper module 34. If coherence is maintained across the aperture, then the output can be generated by a simple unweighted sum of the array of data values representing the estimated contributions at each element. If coherence is not maintained, output signal generation module 32 can provide a weighted sum of the estimated array of data values using weights that would taper down from the data values at the center of the array to its edges.

The operation of each tracker module can be terminated when the differences of successive estimations of far-field signal spatial angles becomes sufficiently small. In the alternative, changes in the power level estimate of successive arrays of signal data values stored in signal estimation array storage element 26 may be determined for terminating that tracker module's cycle. Other methods for establishing threshold values for terminating the operation of each tracker module may also be employed.

The operation of system control unit 16 for isolating a plurality of signals from the signal environment is illustrated by the flow diagrams shown in FIGS. 3A–C. Initially the system control unit obtains an estimate of signal source spatial angles from a Butler Matrix scan of a far-field or from other information sources. Each of these spatial angles is associated with a selected far-field signal and is assigned to a tracker module. Collectively these tracker modules form a sequence list for isolating the plurality of signals. Signal estimation array (SEA) storage elements 26 for each tracker module are initially cleared and the estimated spatial angles are stored in respective phase modules 40 of the selected tracker modules.

Initially, the antenna elements are strobed and the data values for each element are stored in residual signal (RS) storage element 18, steps 42 and 44. The tracker module sequence list, which may be stored in system control unit 16, is referenced for identifying the next tracker module to be activated, step 46. If the list is empty the system waits until the next array of data values is strobed from the array of antenna elements, and the signal estimation array storage elements are cleared, steps 50 and 52. If, on the other hand the tracker module sequence list is not empty, a tracker module is selected for isolating a signal, steps 48 and 54.

Once a tracker module has been selected, the array of data values stored in signal estimation array storage element 26 are added to the array of data values stored in residual signal storage element 18, step 56. Adding this array of data values restores the array of data values stored in residual signal storage element 18 to full strength for that selected signal. The resulting residual array of data values is then copied into phase taper module 34, step 58. The estimated current spatial angle stored in phase-module 40 is then used to compute the element-to-element phase progression expected for that selected signal. Using this estimated spatial angle the expected phase progression is removed from the array of data values stored in phase taper module 34, step 60. This removal of the phase progression is otherwise known as downshifting. The array of phase corrected data values is then sent to estimation module 36, step 62, FIG. 3B. From the phase corrected array of data values, a best estimate of the signal components of the downshifted data is made by processing this array data using the Kalman filter or augmented convolution processor discussed above, step 64. The object here is to obtain a good signal estimate from a finite number of samples where these samples are corrupted by noise and interference caused by the presence of residual traces of other signals.

Once the best estimate is determined, phase refining module 38 determines whether there is any residual phase shift remaining in this array of data values, step 66. Any residual phase progression of values determined to exist is then used to update or modify the estimated spatial angle. The array of data values generated by estimation module 36 is then copied into the storage elements of phase taper module 34 and the original phase progression is restored element-to-element, step 68 and 70. This is otherwise known as an upshift by those skilled in the art. Once the phase progression has been restored, the array of data values is copied into the signal estimation array storage element 26, step 72. This array of data values now represents a revised best estimate of the contribution of the selected signal at each antenna element. This best estimate is then subtracted element-by-element from the array of data values stored in residual signal storage element 18 via the minus setting of switch 22A, step 74, FIG. 3C. This step provides for the suppression of that selected signal from the far-field source assigned to that tracker module. As a result, subsequent tracker modules selected to isolate different far-field signals will not be hindered by this signal.

After subtracting the best estimate from the array of data values in residual signal storage element 18, the estimated spatial angle stored in phase module 40 is replaced with the updated or corrected estimated spatial angle as determined by phase refining module 38, step 76.

In order to determine if that tracker module is to be removed from the sequence list, the difference between the estimated spatial angle and the updated estimated spatial angle is used to determine if a threshold value has been reached, step 78. If the predetermined threshold value has been reached then that tracker module is deleted from the sequence list, step 80; otherwise, it remains on the sequence list for further refining of the signal contributions at each of the array of receiver elements for the selected signal.

Although specific features of the invention are shown in some drawings and not others, this is for convenience only as each feature may be combined with any or all of the other features in accordance with the invention. For example, while the invention has been described in the context of a limited number of data values of signals plus noise obtained from a set of antenna array elements, it will be obvious to those skilled in the art that the invention applies equally well to a variety of other finite data value situations. For instance, in time-domain wave filtering it sometimes occurs that signal analysis must be done from a limited number of time samples of input data. As shown in FIG. 4, this can be accomplished using a single receiver element **12*a* connected to a delay device 12*b* having taps at T-second intervals. Sample switches 14, under the control of system control unit 16, example each tap simultaneously to generate the array of signal data values stored in residual signal storage element 18**.

In this case, phase progression in the array of signal data values in storage element 18 is caused by the frequencies of the signal components so that an equivalence of spatial angle and signal frequency may be established. It is clear then that the invention, when applied to a finite number of time samples, would produce an analysis of the frequencies and power levels of narrowband signal components present in the input data. Thus, all of the advantages of the invention in terms of signal isolation and parameter estimation apply equally well to temporal filtering as well as spatial filtering.

My invention represents a powerful analysis tool for all situations involving a finite number of data samples.

Other embodiments will occur to those skilled in the art and are within the following claims:

What is claimed is:

1. A system for isolating selected signals from an array of signal data values collected from a signal environment by at least one receiver element and stored in a residual signal storage element, the system comprising:

a plurality of tracker modules for selectively reading the array of signal data values to isolate a selected signal, each tracker module including:

means for generating, from the array of signal data values, estimated contributions of a selected signal at each of the plurality of receiver elements; and means, connected to said means for generating, for determining an output signal, based on said estimated contributions, that is representative of the selected signal; and control means for enabling at least a first tracker module of said plurality of tracker modules to selectively read the array of signal data values and to selectively combine the estimated contributions, generated by said means for generating for that tracker module, with the array of signal data values in said residual signal storage element to alter the array of signal data values during the generation of estimated contributions by other tracker modules.

2. The system of claim 1 further including means, connected to said means for generating, for storing the estimated contributions.

3. The system of claim 1 in which said means for determining includes means for summing the estimated contributions to determine the output signal.

4. The system of claim 1 in which said control means includes means for selectively adding or subtracting the estimated contribution to the array of signal data values stored in said residual signal storage element.

5. The system of claim 1 in which said means for generating includes:

means for producing a phase progression of signal data values, based on the array of data values read from said residual signal storage element; and means for estimating, based on the phase progression of signal data values, said estimated contributions of the selected signal at each of the plurality of receiver elements.

6. The system of claim 5 in which said means for producing includes phase angle taper means for compensating the signal data values with a phase corrector, based on an estimated angular position of the selected signal relative to the plurality of receiver elements, to produce the phase progression of signal data values.

7. The system of claim 6 in which said means for generating includes phase angle refining means, connected to said means for estimating, for approximating, based on the phase progression of signal data values, a residual phase progression, for producing, based on the residual phase progression, an updated phase corrector to compensate for the residual phase progression, and for updating the phase corrector of said phase angle taper means with the updated phase corrector for that selected signal.

8. The system of claim 5 in which said means for generating includes phase restoring means for applying a phase restorer to remove the compensation of the phase corrector on the estimated contributions, before said control means selectively combines the estimated contributions with the array of data values in said residual signal storage element.

9. The system of claim 1 in which said control means includes means for selectively enabling each of said plurality of tracker modules to successively generate updated estimated contributions by selectively controlling each of said plurality of tracker modules to selectively read the array of signal data values from said residual signal storage element, to selectively combine the stored estimated contributions, generated by said means for generating, with the array of signal data values in said residual signal storage element to alter the array of signal data values during the generation of estimated contributions by other tracker modules, and to terminate successive generations of updated estimated contributions by that tracker module when a predetermined condition is satisfied.

10. The system of claim 9 in which said control means includes means for selectively attenuating estimated contributions, generated by other tracker modules assigned to isolate different signals, from the array of signal data values in said residual signal storage element.

11. The system of claim 9 in which said control means includes means for adding, to the array of signal data values in said residual signal storage element, estimated contributions previously generated by each tracker module before it is selectively enabled to generate updated estimated contributions.

12. The system of claim 9 in which said control means includes means for directing said means for determining, for each tracker module, to determine the output signal when successive generations of updated estimated contributions are terminated.

13. A system for isolating selected signals from an array of signal data values collected from a signal environment by a plurality of receiver elements and stored in a residual signal storage element, the system comprising:

at least a first tracker module for selectively reading the array of signal data values to isolate a selected signal, said first tracker module including:

phase angle taper means for compensating, based on an estimated angular position of the selected signal relative to the plurality of receiver elements, the array of signal data values with a phase corrector to produce a phase progression of signal data values;

smoother means, connected with said phase angle taper means, for generating, based on the phase progression of signal data values, estimated contributions of the selected signal at each of the plurality of receiver elements;

means for determining, based on said estimated contributions representative of the selected signal, an output signal;

phase angle refining means, connected with said smoother means, for approximating, based on the phase progression of signal data values, a residual phase progression, for producing an updated angular position of the selected signal to compensate for the residual phase progression, and for updating the phase corrector of said phase angle taper means based on the updated angular position; and means, interconnected to said smoother means, for storing the estimated contributions; and control means for enabling said first tracker module to selectively read the array of signal data values and combine the stored estimated contributions, generated by said smoother means, with the array of signal data values in said residual signal storage element to alter the signal data values during the generation of estimated contributions by other tracker modules.

14. The system of claim 13 in which said tracker module further includes:

phase restoring means, interconnected between said smoother means and said means for storing, for receiving the estimated contributions and for applying a phase restorer to the estimated contributions to remove the compensation of the phase corrector applied by said phase angle taper means.

15. A system for isolating selected signals from an array of signal data values collected from a signal environment by a plurality of receiver elements and stored in a residual signal storage element, the system comprising:

a plurality of tracker modules, each configured to isolate a selected signal from the array of signal data values, and each of said tracker modules including:

means, connected to said residual signal storage element, for reading the array of signal data values from said residual signal storage element and for generating, from the array of signal data values, estimated contributions of the selected signal at each of the plurality of receiver elements;

means, connected to said means for generating, for determining, based on said estimated contributions, an output signal that is representative of the selected signal; and means, connected to said means for generating, for storing the estimated contributions; and control means for inducing said plurality of tracker modules to successively generate updated estimated contributions by selectively enabling each of said plurality of tracker modules to read the array of signal data values from said residual signal storage element, to selectively combine the stored estimated contributions, generated by said means for generating for that tracker module, with the array of signal data values in said residual signal storage element for altering the array of signal data values during the generation of estimated contributions by other tracker modules, for terminating successive generations of updated estimated contributions by that tracker module when a predetermined condition is satisfied, and for instructing each tracker module to determine the output signal for that tracker module when successive generations of updated estimated contributions are terminated.

* * * * *